(12) United States Patent
Morgott et al.

(10) Patent No.: US 8,774,961 B2
(45) Date of Patent: Jul. 8, 2014

(54) AUTOMATIC DELIVERY SYSTEM FOR CONTINUOUS BATCH ORDER PROCESSING

(75) Inventors: Anthony F. Morgott, Farmington Hills, MI (US); Mark J. Jordan, South Lyon, MI (US)

(73) Assignee: Andersen & Associates, Inc., Wixom, MI (US)

( * ) Notice: Subject to any disclaimer, the term of this patent is extended or adjusted under 35 U.S.C. 154(b) by 1111 days.

(21) Appl. No.: 12/766,620

(22) Filed: Apr. 23, 2010

(65) Prior Publication Data
US 2011/0259715 A1  Oct. 27, 2011

(51) Int. Cl.
*G06F 7/00* (2006.01)

(52) U.S. Cl.
USPC ........... 700/230; 700/213; 700/223; 700/228; 700/214

(58) Field of Classification Search
None
See application file for complete search history.

(56) References Cited

U.S. PATENT DOCUMENTS

| | | | |
|---|---|---|---|
| 4,653,963 A * | 3/1987 | Taneda et al. | 406/70 |
| 5,443,150 A * | 8/1995 | Buchko | 198/463.3 |
| 2003/0116484 A1 * | 6/2003 | Takizawa | 209/630 |
| 2004/0005080 A1 * | 1/2004 | Hayduchok | 382/101 |
| 2010/0006399 A1 * | 1/2010 | Shiga | 198/781.04 |
| 2010/0254794 A1 * | 10/2010 | Pierson et al. | 414/792.6 |
| 2010/0300944 A1 * | 12/2010 | Carpenter et al. | 209/546 |

* cited by examiner

*Primary Examiner* — Yolanda Cumbess
(74) *Attorney, Agent, or Firm* — Harness, Dickey & Pierce, P.L.C.

(57) ABSTRACT

An automatic delivery system includes a conveyor including powered first rollers arranged in parallel with each other defining a spacing between sequential ones of the first rollers. Fixed second rollers or fixed members are each connected to and coaxially aligned with individual ones of the first rollers and sequentially separated by the first roller spacing. The second rollers are divisible into at least two groups, each defining a loading station. Each of the loading stations has a station positioning device including at least one extension rod extending through and horizontally displaceable within the spacing between sequential ones of the first and second rollers. The station positioning device displaces a container received on the powered first rollers into and out of the loading station. A computer controlling the system and the station positioning device includes data for components inserted into the container at the loading station of each group.

9 Claims, 11 Drawing Sheets

AUTOMATIC DELIVERY SYSTEM FOR CONTINUOUS BATCH ORDER PROCESSING

FIELD

The present disclosure relates to automatic delivery systems for moving goods from an inventory site to a packaging site and away from the packaging site.

BACKGROUND

This section provides background information related to the present disclosure which is not necessarily prior art.

Automated delivery systems commonly use conveyor systems to move empty or incomplete containers to fill sites and subsequently to move completed containers for shipment. Completed containers include one of more items, ordered for example via the Internet, and can be subsequently delivered by a shipping company to individuals or companies. Delivery systems can also include a computer to control the positioning of goods or movement of goods within a warehousing system to facilitate loading the various containers for delivery. The use of one or more carousels having a plurality of individual products or goods to move the products closer to a loading station for an operator or automated loader to insert the products into a container are also known.

SUMMARY

This section provides a general summary of the disclosure, and is not a comprehensive disclosure of its full scope or all of its features.

According to several embodiments of the present disclosure, an automatic delivery system includes a conveyor including rollers arranged in parallel with each other defining a common spacing between any sequential ones of the rollers. The rollers are divisible into at least two groups, each of the at least two groups including a loading station at one end of the rollers. Each of the at least two groups have a station positioning device including at least one extension rod extending through and displaceable within the spacing between sequential ones of the rollers. The station positioning device operates to displace a container received on the rollers into and out of the loading station.

According to further embodiments, an automatic delivery system includes a conveyor including powered first rollers arranged in parallel with each other defining a spacing between sequential ones of the first powered rollers. Fixed second rollers are each connected to and coaxially aligned with individual ones of the first powered rollers and sequentially separated by the spacing of the first powered rollers. The second rollers are divisible into at least two groups, each of the at least two groups defining a loading station. Each of the loading stations has a station positioning device including at least one extension rod extending through and horizontally displaceable within the spacing between sequential ones of the powered first and fixed second rollers. The station positioning device operates to displace a container received on the powered first rollers into and out of the loading station.

According to additional embodiments, an automatic delivery system includes a conveyor having powered first rollers arranged in parallel with each other defining a common spacing between sequential ones of the first powered rollers. Fixed second rollers are each connected to and coaxially aligned with individual ones of the first powered rollers and sequentially separated by the spacing between the first powered rollers. The second rollers are divisible into at least two groups, each of the at least two groups defining a loading station. Each of the loading stations has a station positioning device including at least one extension rod extending through and horizontally displaceable within the spacing between first sequential ones of the powered first and fixed second rollers. The station positioning device operates to displace a container received on the powered first rollers into and out of the loading station. A stop device is positioned between and is extended upwardly and retracted downwardly through the spacing between second sequential ones of the powered first and fixed second rollers. The stop device extended upwardly stops the container for subsequent displacement by the station delivery device, and extended downwardly permits free passage of the container on the first powered rollers.

According to still further embodiments, an automatic delivery system includes a conveyor including rollers arranged in parallel with each other defining a common spacing between any sequential ones of the rollers. The rollers are divisible into at least two groups, each of the at least two groups including a loading station at one end of the rollers. Each of the at least two groups have a station positioning device including at least one extension rod extending through and displaceable within the spacing between sequential ones of the rollers. The station positioning device operates to displace a container received on the rollers into and out of the loading station. At least one carousel includes a plurality of component containing carousel bins. A selected one of the plurality of carousel bins is movable to a pick location for removal of at least one item to be placed in the container positioned in the loading station. A computer controls the station positioning device and the carousel. The computer has access to data for components to be inserted into the container at the loading station of each group and operates to select a next pick location to minimize movement of the at least one carousel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
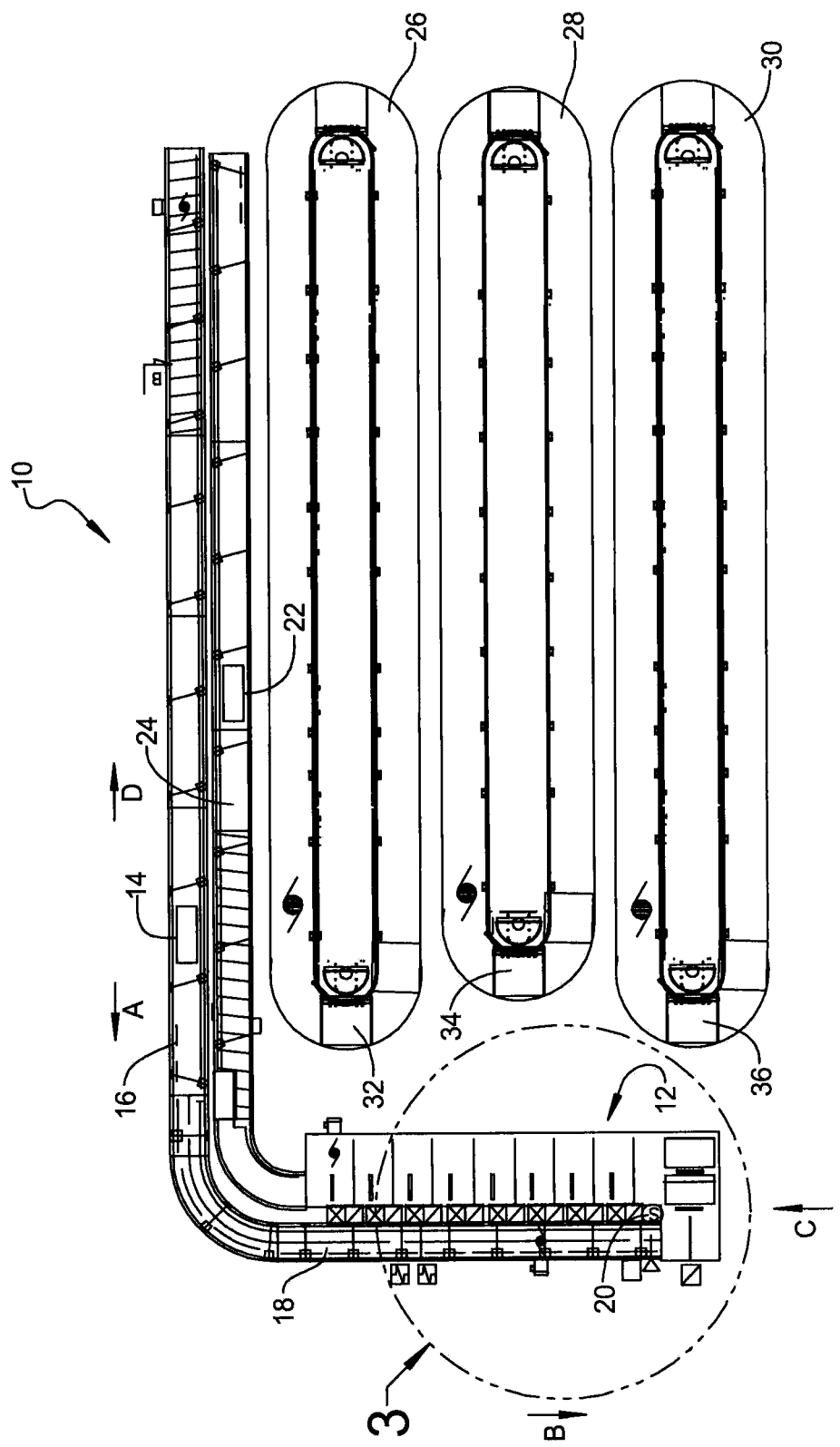
FIG. 1 is a top plan view of an automatic delivery system for moving goods of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a delivery system 10 includes a loading station 12 which receives incomplete containers 14 via a container feed conveyor 16. From the container feed conveyor 16, the incomplete containers 14 change from a first feed direction "A" to a second feed direction "B" for travel on a container receiving station 18. The incomplete containers 14 travel along the container receiving station 18 until they reach a container code reading device 20 which provides input data to the delivery system 10 identifying the size of incomplete container 14 and the predetermined contents to be loaded at loading station 12.

Once one or more products are loaded into container 14, a complete container 22 (having all required content items) is discharged from loading station 12 onto a complete container transport conveyor 24. The complete container 22 travels in a container transport direction "C" as it leaves loading station 12 and can change to a complete container transport direction "D" as it transits the complete container transport conveyor 24.

Individual products that are to be loaded into the containers 14 can be provided on at least one and according to several embodiments multiple carousels such as first, second, and third carousels 26, 28, 30. The first, second, and third carousels 26, 28, 30 rotate to provide each of a first, second, and third pick location 32, 34, 36 which is within reach of an operator located at loading station 12. The configuration of the various conveyers shown in FIG. 1 is one example of an embodiment for delivery system 10. The various conveyors can also be reconfigured from those shown such that infeed and outfeed of the various containers can be in opposite directions or in additional directions depending upon the available space of the facility within which delivery system 10 is constructed.

Figure 2:
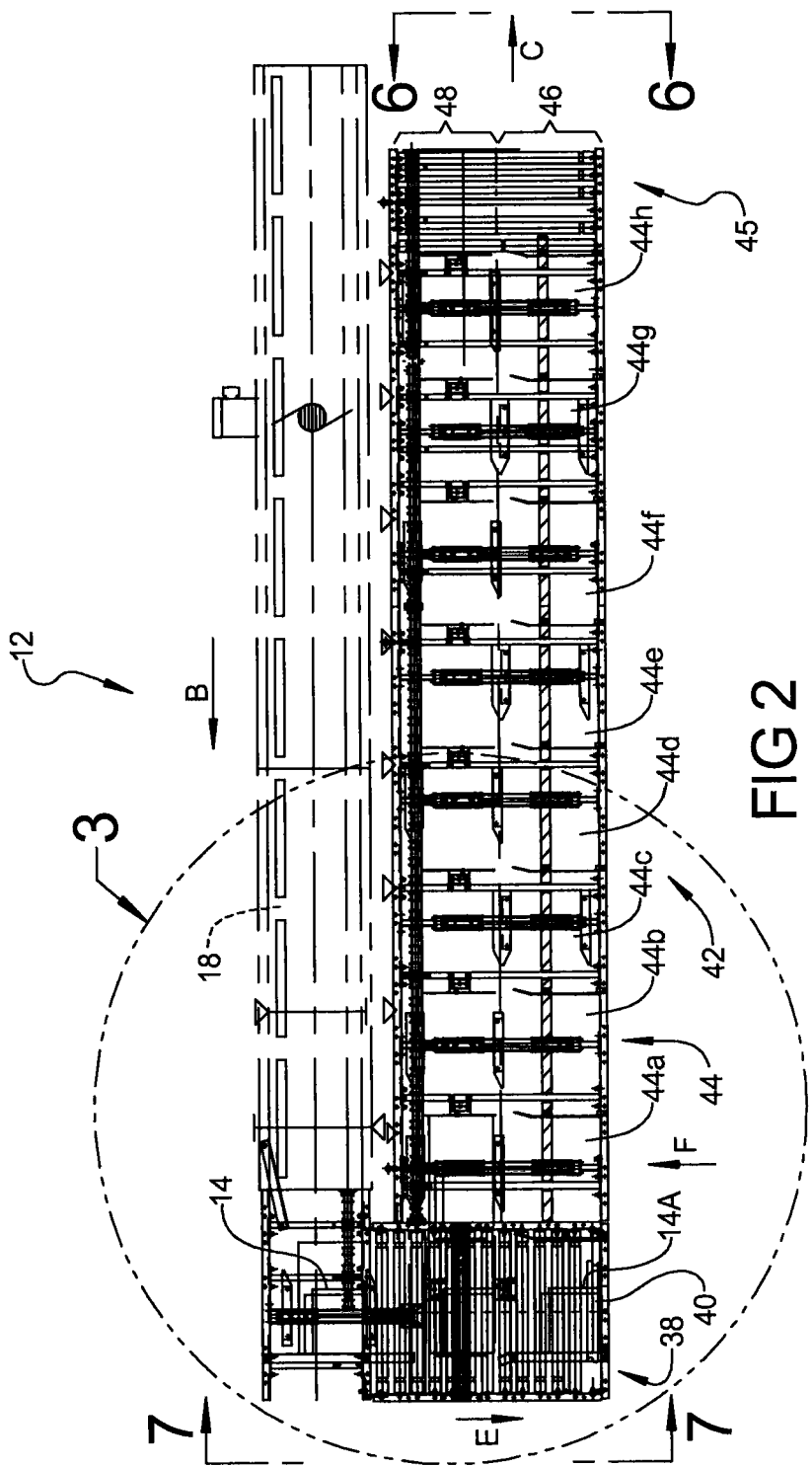
FIG. 2 is a top plan view of a loading station of the automatic delivery system of FIG. 1.

Referring to FIG. 2, loading station 12 further includes a container entry portion 38 which receives containers 14 in a container entry direction "E" as they are unloaded from container receiving station 18. From container entry portion 38, the incomplete containers 14 move onto a container fill station 40 as individual units in the container entry direction "E" or the incomplete containers 14 can be moved in the container transport direction "C" onto a container load/discharge portion 42. Container load/discharge portion 42 includes at least one and according to several embodiments a plurality of loading stations 44 identified for example as loading stations 44a, 44b, 44c, 44d, 44e, 44f, 44g, and 44h. The number of loading stations 44 can vary at the discretion of the designer and eight of the loading stations 44 are shown in the exemplary embodiment representing an example number of loading stations capable of being controlled by a single operator/loader. Each of the loading stations 44 is fed by a conveyor 45 having a load/discharge section 46 and an infeed/discharge section 48. Incomplete containers 14 moving in the container transport direction "C" along container load/discharge portion 42 are individually moved until they reach a desired one of the loading stations 44 at which time they are stopped and then displaced in the container entry direction "E" into the appropriate loading station 44. After each of the containers are filled, devices within the individual loading stations 44 move the complete containers in the complete container discharge direction "F" from the various loading stations 44 into the infeed/discharge section 48 which is powered to move either incomplete containers 14 or complete containers 22 in the container transport direction "C". Container fill station 40 having a container 14a shown is similarly received and filled in container fill station 40 and then moved in the complete container discharge direction "F" to align the now complete container 22 with the infeed/discharge section 48 for discharge in the container transport direction "C".

Figure 3:
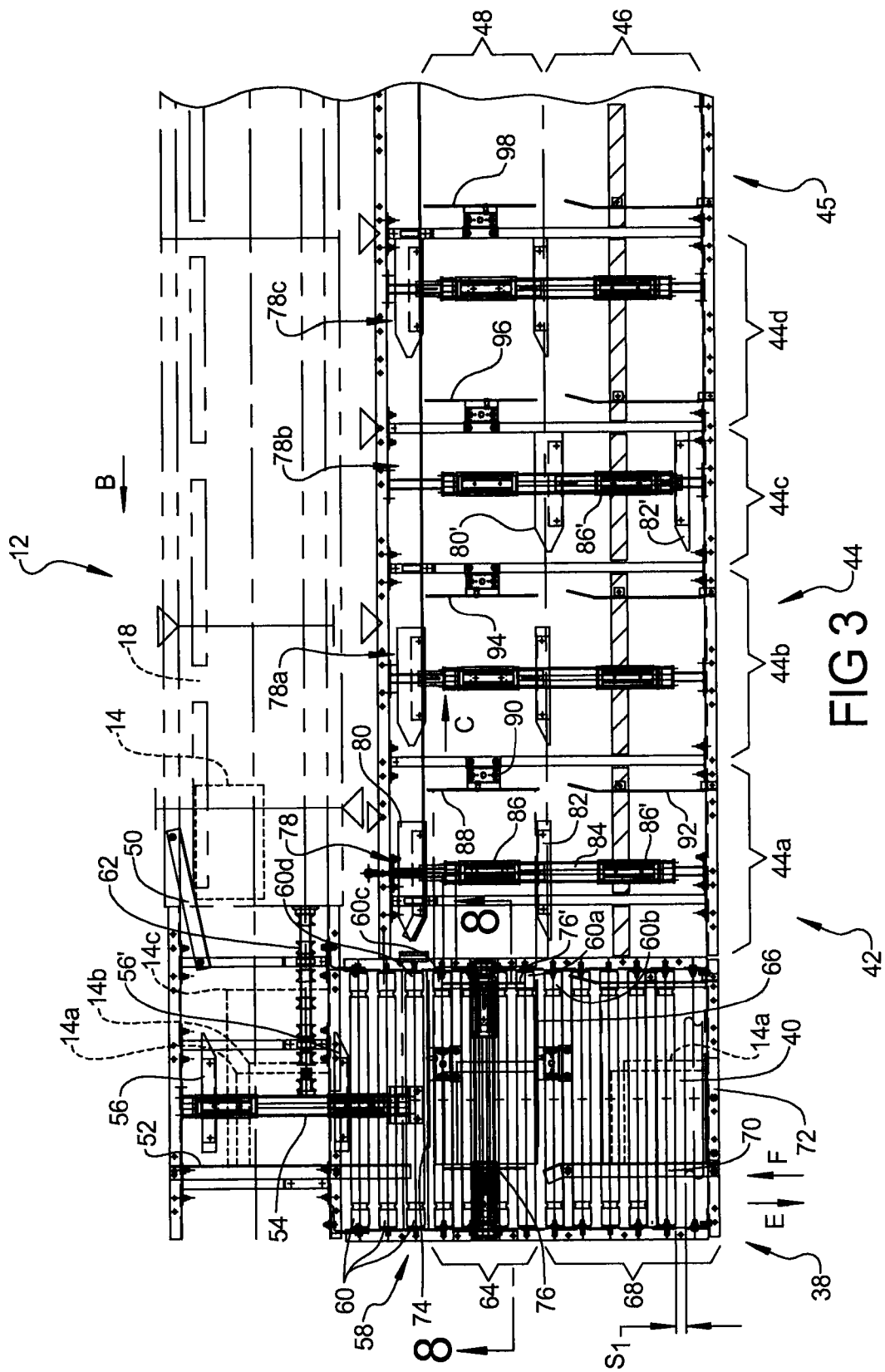
FIG. 3 is a top plan view of area 3 of the loading station of FIG. 2.

Referring to FIG. 3, loading station 12 further includes a directing bar 50 which realigns the individual incomplete containers 14 moving in the second feed direction "B" along container receiving station 18 to align the incomplete containers 14 to be subsequently stopped by a stop member 52. Once the incomplete container 14 contacts stop member 52, the incomplete container is moved in the container entry direction "E" using an incomplete container rod-less cylinder 54 which includes a first pusher member 56 movable between the positions indicated by first pusher member 56 and first pusher member 56'. As used herein, the term "rod-less cylinder" also broadly includes linear actuator, magnetic cylinder and similar linear movement devices. First pusher member 56 displaces the incomplete container 14 onto an entry conveyor system 58 having a plurality of powered conveyor rollers 60 sequentially spaced from each other by a common spacing "$S_1$". Conveyor rollers 60 are individually rotated by a rotating power shaft 62 which is driven by a motor (not shown). Incomplete containers 14 delivered onto conveyor rollers 60 continue to be directed by stop member 52 until the incomplete container 14 reaches a container redirecting section 64 of container entry portion 38.

A second stop device 66 is positioned between conveyor rollers 60a and 60b. Second stop device 66 can be raised or lowered such that an incomplete container 14 received in container redirecting section 64 can be passed directly through into container fill station 40, or stopped by second stop device 66 in a raised position for subsequent redirecting of the incomplete container 14 onto container load/discharge portion 42. A plurality of the conveyor rollers 60 are sequentially positioned at the container fill station 40 to define a container first loading section 68. An incomplete container such as incomplete container 14a received in the container fill station 40 abuts against a second stop member 70 which is fixed in position and coaxially aligned with stop member 52 until the incomplete container 14a contacts a fixed stop member 72 at the position of incomplete container 14a shown.

After the container is filled in container fill station 40, a direction of rotation of each of the conveyor rollers 60 of container first loading section 68 and container redirecting section 64 can be reversed to move the now complete container in the complete container discharge direction "F" until the complete container contacts a raised third stop device 74. Third stop device 74 is positioned between conveyor rollers 60c and 60d, respectively. Similar to second stop device 66, third stop device 74 can be raised or lowered to be above or below the elevation of conveyor rollers 60 in container redirecting section 64. For example, third stop device 74 is positioned in the lowered position to permit incomplete container 14a to reach the container fill station 40. Once the now complete container 22 contacts third stop device 74, a third pusher member 76, which is coaxially aligned with each of stop member 52 and second stop member 70 in a first operating position, is moved from the position shown as third pusher member 76 to the position shown as third pusher member 76'.

At the position shown as third pusher member 76', the complete container 22 or another incomplete container 14 is moved onto infeed/discharge section 48 in the container transport direction "C". Third pusher member 76 thereafter returns to the position shown which is coaxially aligned with stop member 52 until a next sequence of operations occurs. Each of the loading stations 44 includes a station positioning device 78 represented by the various station positioning devices 78, 78a, 78b, and 78c. Each station positioning device 78 includes a first pusher/alignment member 80 and an oppositely positioned second pusher/alignment member 82. The first and second pusher/alignment members 80, 82 are movable from the positions shown in the container entry direction "E" to displace an incomplete container 14 into one of the loading stations 44. Each of the station positioning devices 78 therefore includes a rod-less cylinder 84 having a slidably displaced carriage member 86 with the first and second pusher/alignment members 80, 82 connected thereto. The carriage member 86 is movable from the position shown as carriage member 86 to the position shown as carriage member 86' by powered operation such as by using a pressurized air system for displacement.

If the incomplete container 14 is to be moved from infeed/discharge section 48 into loading station 44a, for example, a first stop device 88, which is similar to second and third stop devices 66, 74 in operation, will be raised to provide a stop point for the incomplete container 14, therefore positioning the incomplete container 14 between first and second pusher/alignment members 80, 82. First stop device 88 is actuated using a stop actuator 90 which is connected to structure supporting loading station 12. First stop device 88 is coaxially aligned with an alignment guide 92, commonly provided in each of the loading stations 44. The incomplete container 14 moving into loading station 44a therefore slides with respect to first stop device 88 until it slidably contacts alignment guide 92, which provides a consistent location for any of the incomplete containers 14 received in loading station 44a or any of the other loading stations.

The first and second pusher/alignment members 80, 82 are retained in the displaced position (i.e., as shown in loading station 44c) as the container is filled. Once the one or more items required for the container are loaded creating a complete container 22, the carriage member 86 (shown as carriage member 86' in loading station 44c) is commanded to move in the complete container discharge direction "F", whereby second pusher/alignment member 82' provides a motive force for displacing the now complete container 22 from the loading station 44c and back onto infeed/discharge section 48 for discharge from loading station 12. In feed/discharge section 48 further includes an individual stop device (such as fourth, fifth, sixth stop devices 94, 96, 98) associated with each of the individual loading stations (i.e., loading stations 44b, 44c, 44d) to stop the travel of an incomplete container 14 traveling in the container transport direction "C" on infeed/discharge section 48 for subsequent delivery into one of the various loading stations 44. Each of the stop devices operate in a similar manner using a similar stop actuator, such as stop actuator 90.

Figure 4:
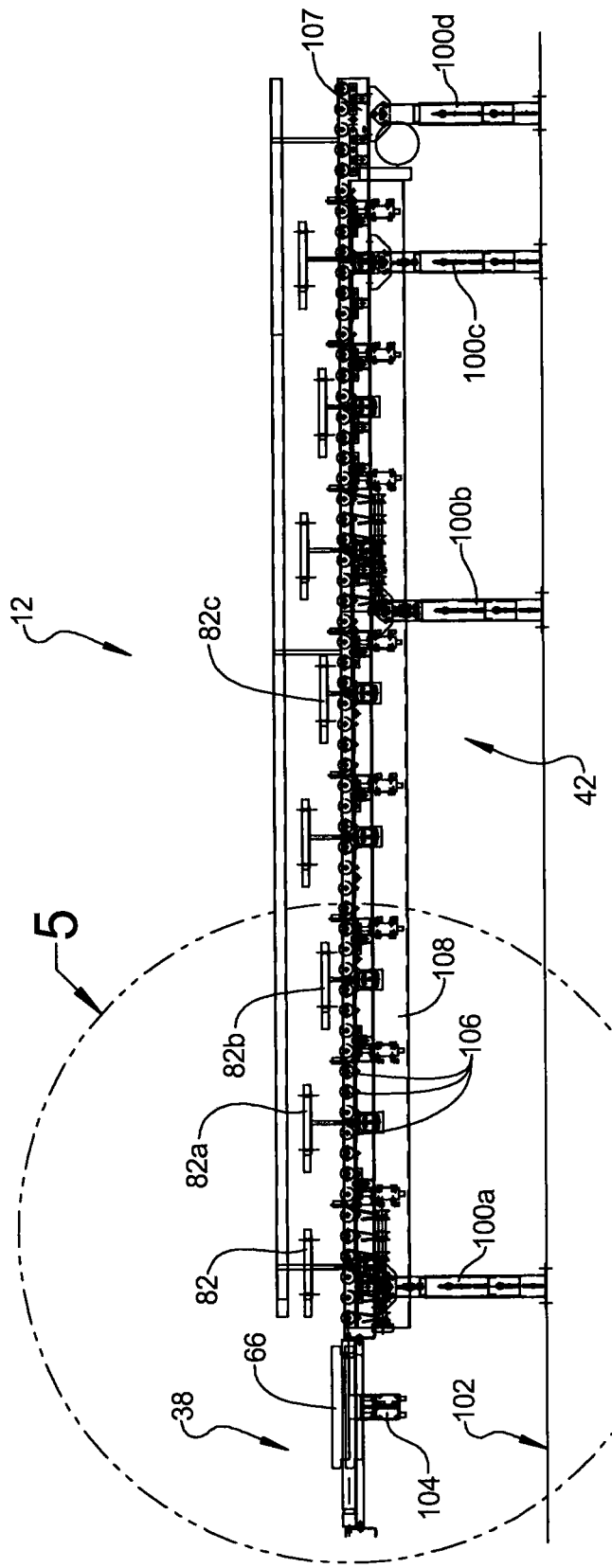
FIG. 4 is a front elevational view of the loading station of FIG. 2.

Referring to FIG. 4, loading station 12 can further include a plurality of support stanchions 100 (such as support stanchions 100a, 100b, 100c, 100d) generally oriented in a vertical configuration and connected to a support surface 102, such as a substantially planar floor surface. Container entry portion 38 further includes a second stop device actuator 104 operable to move second stop device 66 upwardly or downwardly as previously described herein. A plurality of substantially equally spaced, partially fixed conveyor rollers 106 are arranged in parallel and rotatably connected to a roller support structure 107. Roller support structure 107 is subsequently connected to a support beam 108, which is connected to and supported by the various support stanchions 100. The height of the conveyor rollers 106 with respect to support surface 102 can be varied, if desired, by using adjustable members in support stanchions 100 to accommodate a plurality of container sizes.

Figure 5:
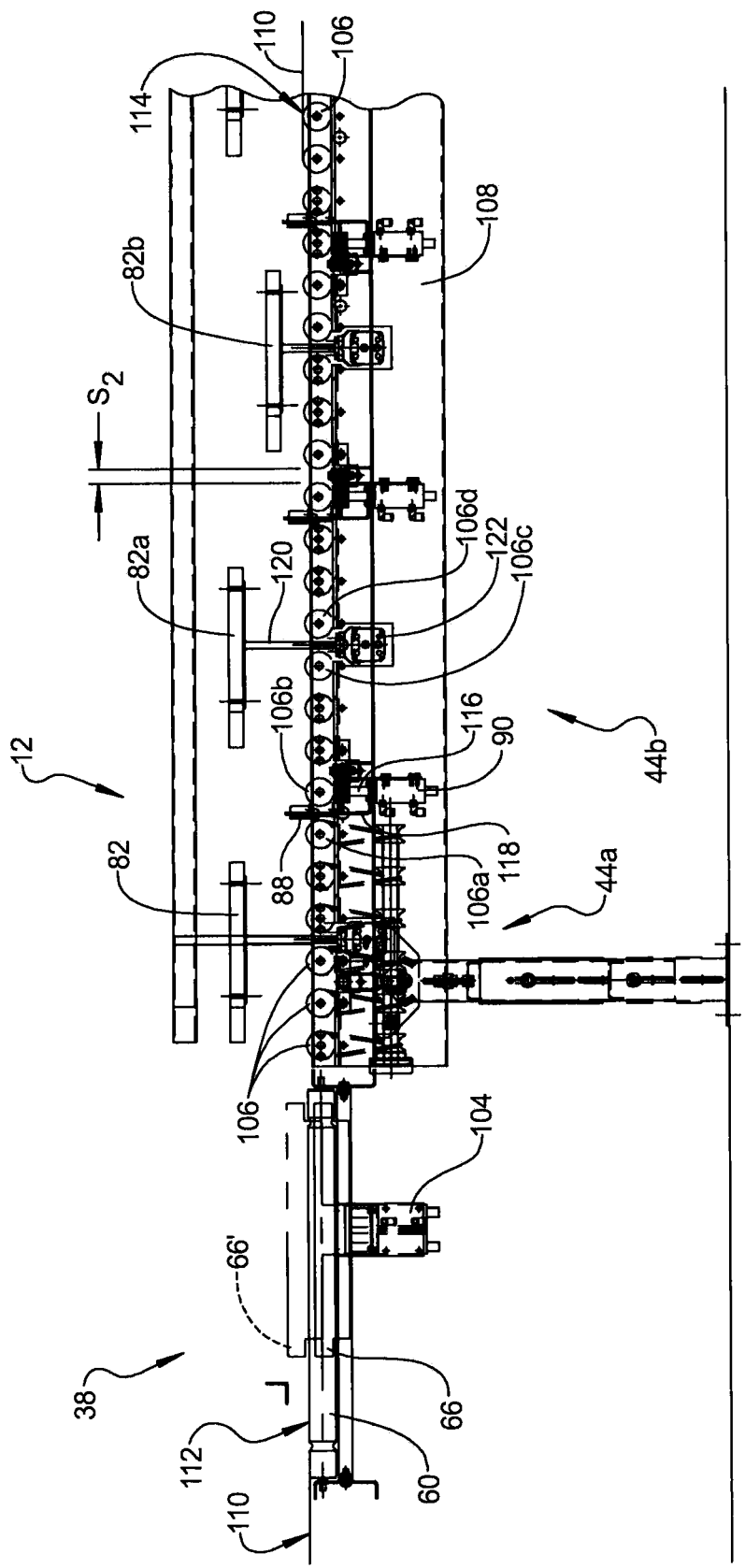
FIG. 5 is a front elevational view of area 5 of FIG. 4.

Referring to FIG. 5, each of the conveyor rollers 60 of container entry portion 38 are arranged in parallel with each other such that a planar surface 110, defined by the upper surface 112 of each of the conveyor rollers 60, is oriented coplanar to the same planar surface 110 defined by the upper surfaces 114 of each of the conveyor rollers 106. As shown, second stop device 66 can be lowered to a position below planar surface 110 to permit free transportation of the containers and can be raised to the position shown at second stop device 66', positioned above the planar surface 110, by actuation of second stop device actuator 104. The first stop device 88 and similar stop devices are movable by an extendable shaft 116 connected to a stop device arm 118. Stop actuator 90, for example, displaces the extendable shaft 116, thereby moving both stop device arm 118 and first stop device 88 either upwardly or downwardly. Each of the stop devices, such as first stop device 88, is positioned between successive ones of conveyor rollers 106, such as between conveyor rollers 106a, 106b. Each of the various pusher members, such as second pusher/alignment member 82a, includes a pusher extension rod 120 connected to a pusher actuator, such as pusher actuator 122. Pusher actuator 122 is connected to support beam 108. The pusher extension rod 120, similar to stop device arm 118, is positioned between successive ones of the conveyor rollers 106, such as between conveyor rollers 106c, 106d.

Figure 6:
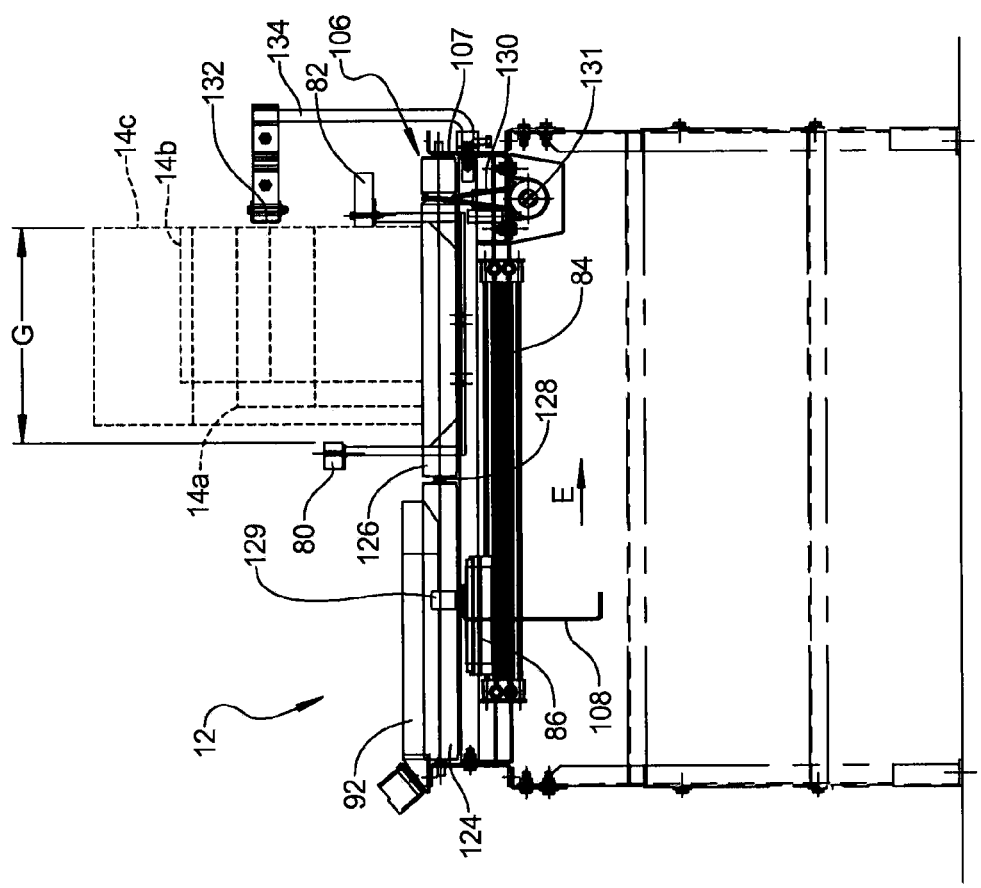
FIG. 6 is an end elevational view at section 6 of FIG. 2.

Referring to FIG. 6, each of the conveyor rollers 106 is divisible into a fixed roller 124 and a powered roller 126. Fixed roller 124 is not axially rotatable and is therefore fixed in position to receive and temporarily support the individual incomplete or complete containers. A bearing assembly 128 separates fixed roller 124 from powered roller 126, permitting powered roller 126 to axially rotate. A drive belt 130 or any similar drive or motive device is provided for each of the individual powered rollers 126, which if in belt form is rotatably connected to a drive shaft 131 powered by a motor (not shown). A guide member 132 can be provided at loading station 12, which can provide additional support for taller ones of the containers (i.e., container 14c). Guide member 132 is supported by a plurality of guide member support arms 134, which can be connected to roller support structure 107. According to additional embodiments, fixed rollers 124 can also be replaced by any fixed or stationary surface.

Figure 7:
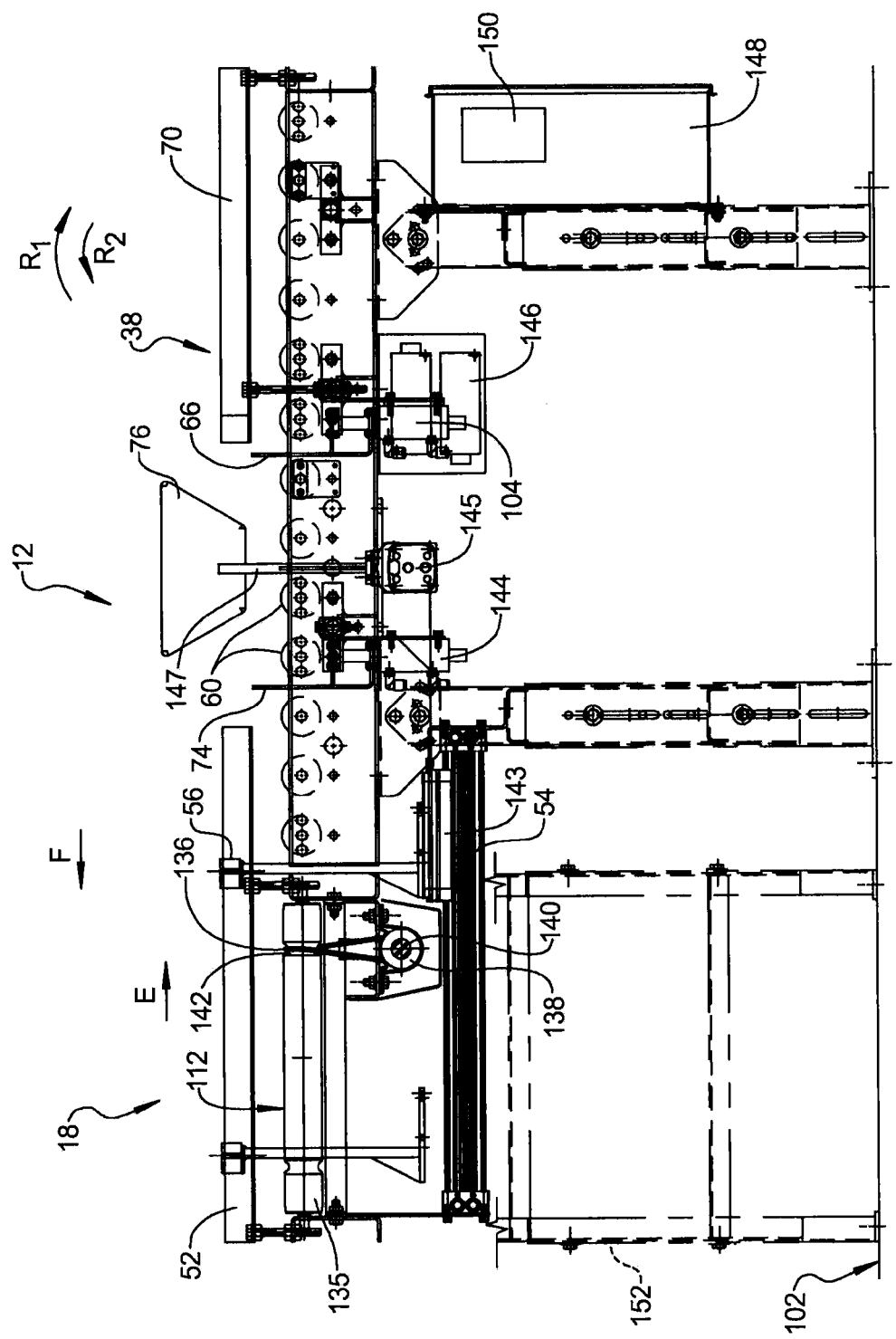
FIG. 7 is an end elevational view taken at section 7 of FIG. 2.

Referring to FIG. 7 and again to FIG. 3, container receiving station 18 includes a plurality of powered rollers 135 directing incomplete containers 14 toward stop member 52. Similar to powered rollers 126 shown and described with respect to FIG. 6, each of the conveyor rollers 60 of container entry portion 38 is similarly rotated using a drive belt 136 connected to a pulley 138, which is rotated by a drive shaft 140. As previously noted, after the container is completed in container fill station 40, a direction of rotation $R_1$ of each of the conveyor rollers 60 used to direct the container in the container entry direction "E" onto container first loading section 68 and container redirection section 64 can be reversed to a direction of rotation $R_2$ to move the now complete container in the complete container discharge direction "F" until the complete container contacts raised third stop device 74. Second stop device 66 is lowered during this event. The one or more drive belts 136 is/are received in a drive slot 142 created in each of the conveyor rollers 60. Drive slot 142 is provided to maintain alignment of pulley 138 and also to keep each drive belt 136 positioned below upper surface 112, thereby not interfering with the passage of the containers with respect to upper surface 112. A carriage member 143 is slidably disposed on incomplete container rod-less cylinder 54 to slidably displace pusher member 56. A third stop device actuator 144 is provided to upwardly and downwardly move third stop device 74. A pusher member actuator 145 connected to a pusher member rod 147 is actuated to move third pusher member 76. An actuator controller 146 can be provided to control the flow of, for example, pressurized air to any of the stop actuators 90, second stop device actuator 104, pusher actuators 122, stop device actuator 144, and/or pusher member actuator 145.

A system controller 148 is provided, which communicates with each of the drive motors, stop actuators, and pusher actuators, to direct operation of these items in the sequential order necessary for moving the containers about loading station 12. System controller 148 therefore may contain hardware and electronic controls directed to the sequential operation of loading station 12, including operation of the various motors for driving the conveyor rollers and code reading devices. According to several embodiments, a programmable logic device and/or one or more computers, herein collectively defined as a computer 150 is also provided with delivery system 10, which can be incorporated within system controller 148. Computer 150 can be programmed with or connected to other computers or databases to request information, such as the type and quantity of components to be inserted into each container, the station or stations at which individual containers are directed to, the timing of the entry and exit of the various containers from the system, the timing of operation of the various stop devices and pusher members, and can receive and implement commands for operation of system controller 148 from a programmer and/or an operator. Loading station 12 can further include a support frame 152 adapted to support the features of container entry portion 38.

Figure 8:
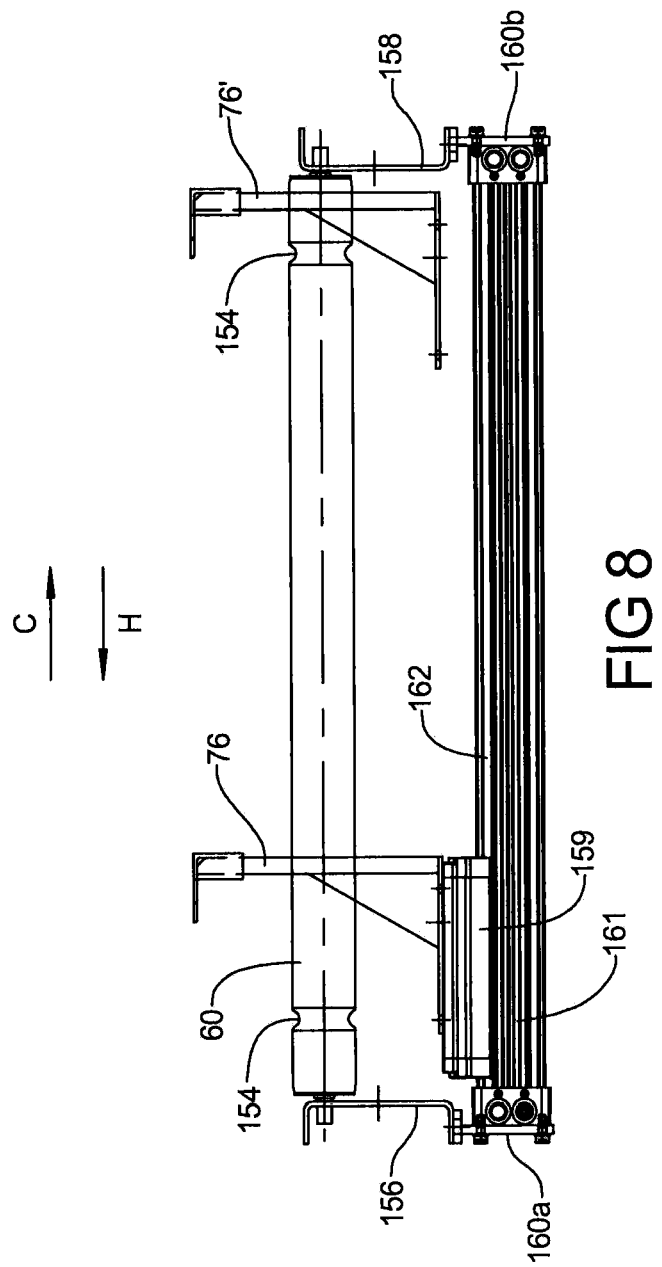
FIG. 8 is a partial cross sectional view taken at section 8 of FIG. 3.

Referring to FIG. 8, the plurality of conveyor rollers 60, each having a drive slot 154, is rotatably disposed with respect to first and second mount brackets 156, 158, which themselves are fixedly connected to first and second mount plates 160a, 160b. An exemplary one of the rod-less cylinders is shown in greater detail having third pusher member 76 connected to a carriage member 159 which is slidably disposed on rod-less cylinder 161. In addition to first and second mount brackets 156, 158, rod-less cylinder 161 can further be fixedly connected to the first and second mount plates 160a, 160b. Rod-less cylinder 161 includes a slide track 162 which provides for sliding motion of carriage member 159 and thereby third pusher member 76 between the first and second mount plates 160a, 160b. Third pusher member 76 can slide between the position shown as third pusher member 76 to the position shown as third pusher member 76' in each of the container transport direction "C" and pusher return direction "H".

Figure 9:
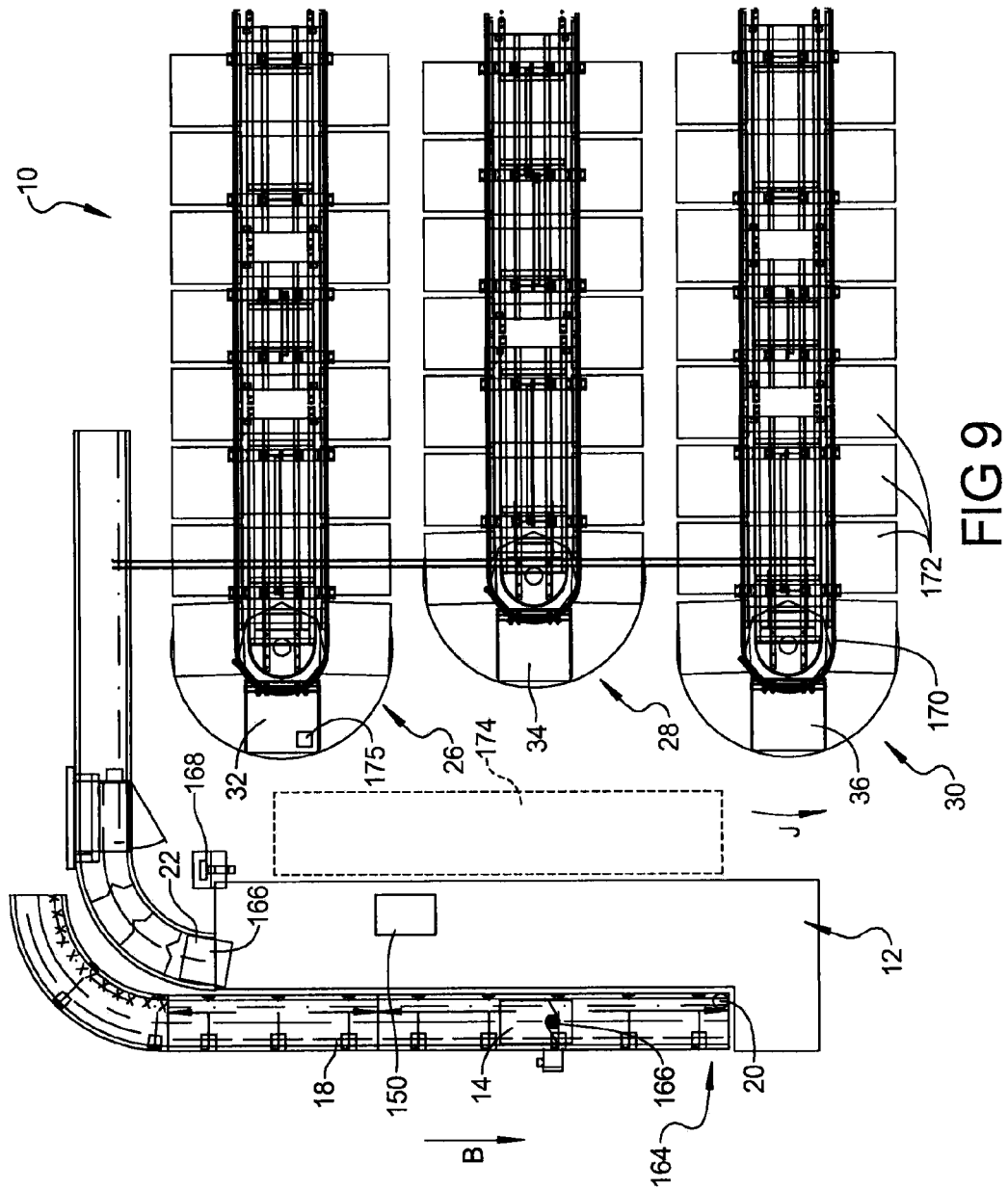
FIG. 9 is a top plan view similar to FIG. 1 showing further details of the automatic delivery system.

Referring to FIG. 9, delivery system 10 includes a container reading station 164 which includes container code reading device 20 which is capable of reading a automatic identification 166 attached to each of the incomplete containers 14 as they arrive at container reading station 164. This data indicating the individual type of incomplete container 14 and its entrance into the system is then transmitted to computer 150, shown and described in reference to FIG. 7. A complete container code reading device 168 can also be provided at a discharge end of loading station 12 which is operable to read an automatic identification 166 such as a bar code or RF tag, RFID reader, or similar means of container identification from the now complete container 22 as it leaves loading station 12. This information is also forwarded to computer 150 which confirms that complete container 22 has exited from loading station 12.

Each of the first, second, and third carousels 26, 28, 30 can include a motorized track 170 about which a plurality of carousel bins 172 are connected and rotate with respect to a carousel rotational direction "J" which can be either a clockwise or counterclockwise direction of rotation. Delivery system 10 is provided with the information relating the individual components 175 which are provided in the carousel bins 172 with this information further programmed into computer 150. Delivery system 10 is, therefore, programmed to provide the individual carousel bins 172 necessary to fill individual ones of the containers 14 with at least one item 175 by an operator positioned within a fill area 174 by positioning the various carousel bins 172 at individual ones of the first, second, or third pick locations 32, 34, 36, which are proximately located to fill area 174.

Figure 10:
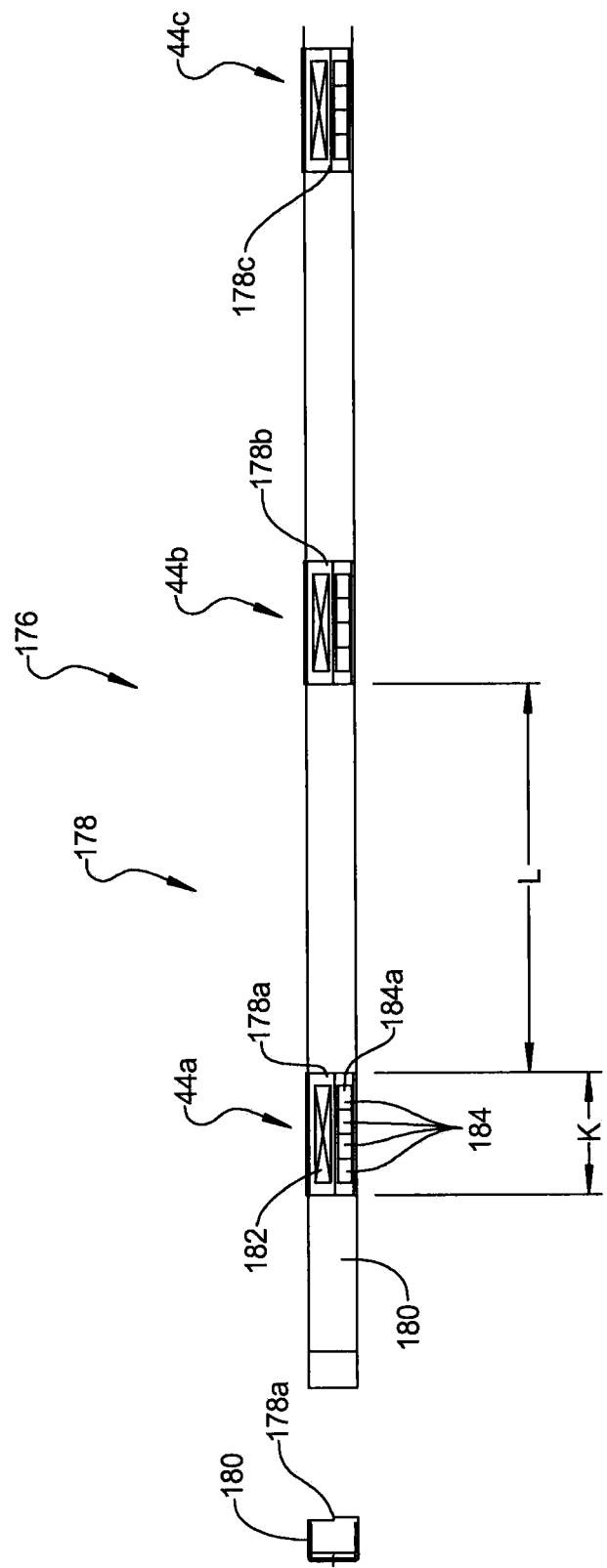
FIG. 10 is a front elevational view of a put-to-light section of the loading station.

Referring to FIG. 10, a put to light system 176 provides a plurality of push button display units 178, shown for example as push button display units 178a, 178b, 178c, positioned in individual ones of loading stations 44a, 44b, 44c. Each of the push button display units 178 is connected to a mounting channel 180 which can be connected to structure of loading station 12. Each of the push button display units 178 includes a data read out screen 182, which provides for the operator component information such as an identification number, and a quantity of a unique component required to fill/complete an individual container or two or more containers, and other information related to completing the container, such as loading station 44a. A plurality of data entry buttons 184 is provided with each of the push button display units 178 for the operator to enter data, such as the quantify of the part or parts actually loaded into the container. Included with data entry buttons 184 is a container complete button 184a, which the operator presses to indicate to delivery system 10 that the container positioned at the appropriate loading station has been completed. This information presented by and input into push button display unit 178 is also transmitted to computer 150, shown and described with reference to FIG. 7.

Figure 11:
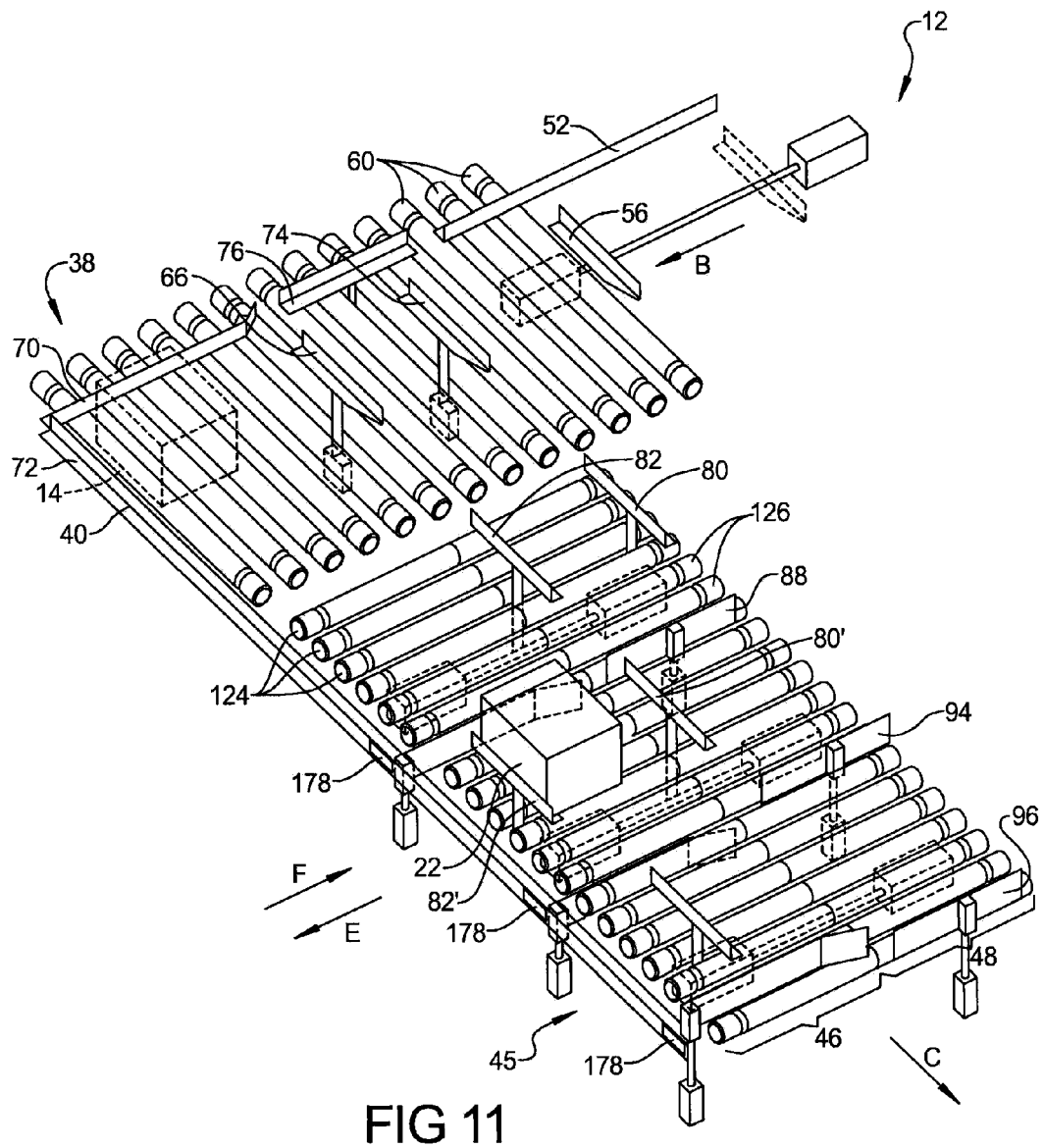
FIG. 11 is a right front perspective view of the automatic delivery system.

Referring to FIG. 11, operation of loading station 12 can be as follows. An incomplete container 14 received at stop member 52 is pushed by operation of first pusher member 56 in the second feed direction "B" onto conveyor rollers 60 of container entry portion 38. If the incomplete container 14 is to be transferred to container fill station 40, both second and third stop devices 66, 74 are positioned in a lowered position below the upper plane defined by conveyor rollers 60. Conveyor rollers are rotated to move incomplete container 14 in the second feed direction "B" until incomplete container 14 contacts fixed stop member 72, at which time the container is available for filling. Once filled, the direction of rotation of conveyor rollers 60 is reversed to move the now complete container (re-identified as a complete container 22) in the complete container discharge direction "F". Second stop device 66 is kept at the lowered position and third stop device 74 is raised to stop complete container 22 such that subsequent operation of pusher member 76 in the container transport direction "C" pushes the container onto power rotated rollers 126 for subsequent discharge from loading station 12.

For other incomplete containers 14 moving onto conveyor rollers 60, third stop device 74 is positioned at the lowered position and second stop device 66 is raised to stop the container(s) for subsequent movement by pusher member 76 onto power rotated rollers 126. The incomplete container is moved in the container transport direction "C" on power rotated rollers 126 until reaching the predetermined loading station 44. To stop the incomplete container at the desired loading station, one of the first, fourth, fifth, or later stop devices 88, 94, 96 and the like is raised. The appropriate first and second pusher/alignment members 80, 82 (or 80', 82' or the like) is moved in the container entry direction "E" until the incomplete container is positioned on fixed rollers 124 of infeed/discharge section 48, where the container is loaded. The operator receives the appropriate loading information on the pushbutton display unit 178 at the loading station, and notifies the system when all the tasks (fill items) related to the container are complete (or if all the available parts in the carousel have been loaded) by data entry into pushbutton display unit 178. This complete signal notifies the delivery system that complete container 22 should be moved in the complete container discharge direction "F" by actuation of first and second pusher/alignment members 80, 82 (or 80', 82' or the like) until the complete container is moved onto power rotated rollers 126 of load/discharge section 46.

Once the complete container 22 is positioned on power rotated rollers 126, the appropriate ones of first, fourth, fifth, and later stop devices 88, 94, 96 and the like are sequentially lowered to permit the complete container to exit load/discharge section 46 in the container transport direction "C". The incomplete or complete status of each of the containers on loading station 12 is tracked by delivery system 10, as well as the position of each container. Additional sensor devices such as UPC code readers or similar identification devices noted herein can be used at each loading station and/or at each position of the first, fourth, fifth, and later stop devices 88, 94, 96 and the like if desired.

An automatic delivery system 10 of the present disclosure can therefore include conveyor 45 having rollers 106 arranged in parallel with each other defining a common spacing "$S_2$" between any sequential ones of the rollers 106. Spacing "$S_2$" can be equal to or different from spacing "$S_1$" used for rollers 60 of container entry portion 38. The conveyor rollers 106 are divisible into at least two groups defined as load/discharge section 46 and infeed/discharge section 48, each of the at least two groups including a loading station 44 at one end of the conveyor rollers 106. Each of the at least two groups having a station positioning device 78 including at least one extension rod 120 extending through and displaceable within the spacing "$S_2$" between two sequential ones (for example 106c, 106d) of the rollers 106, the station positioning device 78 operating to displace a container 14 received on the rollers 106 into and out of the loading station 44.

According to other embodiments, automatic delivery system 10 includes conveyor 45 having first powered rollers 126 arranged in parallel with each other defining a spacing "$S_2$" between sequential ones of the powered rollers 126. Second fixed rollers 124 are each connected to and coaxially aligned with individual ones of the powered rollers 126 and sequentially separated by the spacing "$S_2$" of the first powered rollers 126. The second fixed rollers 124 are divisible into at least two groups, each of the at least two groups defining a loading station 44 such as loading stations 44a, 44b, 44c, and the like. Each of the loading stations 44 have a station positioning device 78 including at least one extension rod 120 extending through and horizontally displaceable within spacing "$S_2$" between two sequential ones of the powered first and fixed second rollers (for example between conveyor rollers 106c, 106d), the station positioning device 78 operating to displace a container 14 received on the first powered rollers 126 into and out of the loading station (44a, 44b, 44c, and the like).

Referring again to FIGS. 3 and 6, according to further embodiments, the rollers 60 of container entry portion 38 and the fixed rollers 124 can be replaced with individual fixed members or by fixed surfaces having access for operation of the various pusher members and stop devices created therethrough. Other types of conveyors such as fixed or belt conveyors can also be used in place of rollers 60 of container entry portion 38 and the fixed rollers 124.

According to still other embodiments, a stop device (such as first stop device 88) is positioned between and extended upwardly and retracted downwardly through the spacing "$S_2$," between second sequential ones (106a, 106b) of the first powered rollers 126 and second fixed rollers 124. The stop device (such as first stop device 88) is extended upwardly to stop the container 14 for subsequent displacement by the station positioning device 78, and is extended downwardly to permit free passage of the container 14 on the first powered rollers 126.

With continuing reference to the Figures, containers 14 are scanned automatically when entering the Continuous Batch Order Processing System 10. As each container 14 is scanned, computer 150 assigns a loading station destination and then controls and tracks the routing of that container 14 to the assigned station. Once the container 14 reaches the assigned loading station, computer 150 retrieves picking data (i.e., item stock numbers and quantities) from a database or other computer having this data, calculates optimum first, second, and/or third carousel 26, 28, or 30 rotation direction and pick sequence, then sends rotational commands to a carousel controller to retrieve the product(s) required. Multiple ones of first, second, and third carousels 26, 28, 30 may spin concurrently to their next pick location. If additional container loading stations 44 are empty, incomplete containers 14 will be automatically inducted, scanned, and routed to their assigned locations until all stations 44 are occupied or there are no additional containers to induct.

As pick information is sent to the carousels 26, 28, 30, computer 150 monitors the rotation of carousels 26, 28, 30. When the carousel(s) 26, 28, and/or 30 reach the desired picking location 32, 34, 36, computer 150 illuminates a pick light display adjacent to the pick position identifying the location and quantity of product (item) to pick at pick location 32, 34, or 36. In addition, a PC display adjacent to the carousel 26, 28, or 30 shows a graphical representation of the pick location on a carousel shelf, a picture of the item to pick (if available), a quantity to pick, an item description, and any additional information applicable to the required task. Concurrently, one or more put-to-light displays located in front of each container 14 at the loading stations 44 will display the quantity of product (item or items) to put into each adjacent container 14. Once the item (product or products) have been picked and placed in each container 14 indicated by computer 150, the operator depresses the task complete button at the appropriate container loading station 44 pushbutton display unit 178 to signal completion of the put (task) for the product picked.

After all containers 14 requiring a put from that location (i.e., first, second, or third pick locations 32, 34, 36) have been loaded as acknowledged by the task complete button 184a, computer 150 will internally flag that task as complete and send the next required pick location to the carousel controller. If selected in an operational configuration, an operator will be requested to verify a carousel stock location as being empty-while-picking if the expected result of completing the pick fully depletes stock at the carousel picking location 32, 34, 36. As any container at a loading station becomes complete, computer 150 will display 'DONE' on the put light at the pushbutton display unit 178 of the particular loading station 44, automatically transfer the completed container 22 back to the infeed/discharge conveyor 48 and automatically induct the next incomplete container 14 into the now empty loading station 44. As each incomplete container 14 reaches the load location 44, the computer 150 recalculates required picks and optimum carousel rotational sequence for all containers in the batch.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An automatic delivery system, comprising:
   a conveyor including:
      powered first rollers arranged in parallel with each other defining a spacing between sequential ones of the first powered rollers;
      fixed members each connected to and coaxially aligned with individual ones of the first powered rollers and sequentially separated by the spacing of the first powered rollers; and
      the fixed members divisible into at least two groups, each of the at least two groups defining a loading station;
   each of the loading stations having a station positioning device including at least one extension rod extending through and horizontally displaceable within the spacing between sequential ones of the powered first and fixed members, the station positioning device operating to displace a container received on the powered first rollers into and out of the loading station;
   a container entry portion having a plurality of second rollers oriented transverse to the first rollers and fixed members and sequentially separated by a spacing, the plurality of second rollers being rotatably powered in a first direction and an opposite second direction; and
   a pusher member connected to a pusher member rod, the pusher member rod positioned between sequential ones of the second rollers and displaceable horizontally to move the container from the second rollers onto the powered first rollers.

2. The automatic delivery system of claim 1, further including a movable carriage member having at least one extension rod connected to the carriage member.

3. The automatic delivery system of claim 2, further including a rod-less cylinder having the carriage member slidably moved by the rod-less cylinder, the rod-less cylinder positioned below the first rollers and fixed members.

4. The automatic delivery system of claim 1, wherein each of the loading stations further includes a stop device positioned between and extended upwardly and retracted downwardly through the spacing between second sequential ones of the powered first rollers and fixed members, the stop device extended upwardly to stop the container for subsequent displacement by the station delivery device, and extended downwardly to permit free passage of the container on the powered first rollers.

5. The automatic delivery system of claim 4, further including a stop actuator positioned below the first rollers and fixed members and connected to the stop device, the stop actuator providing a motive force to extend and retract the stop device.

6. The automatic delivery system of claim 1, wherein the station positioning device includes first and second pusher alignment members connected to the at least one extension rod, the first and second pusher alignment members receiving the container therebetween, the first pusher alignment member acting to push the container into the loading station and the second pusher alignment member acting to push the container out of the loading station and onto the powered first rollers.

7. An automatic delivery system, comprising:
 a conveyor including:
  powered first rollers having a spacing between sequential ones of the first powered rollers;
  fixed members each connected to and coaxially aligned with individual ones of the powered first rollers and sequentially separated by the spacing of the powered first rollers, the fixed members divisible into at least two groups, each of the at least two groups defining a loading station;
 a plurality of second rollers oriented transverse to the powered first rollers and the fixed members; and
 a pusher member connected to a pusher member rod, the pusher member rod positioned between sequential ones of the second rollers and displaceable horizontally to move a container from the second rollers onto the powered first rollers.

8. The automatic delivery system of claim 7, wherein the plurality of second rollers are rotatably powered in a first direction and an opposite second direction.

9. The automatic delivery system of claim 8, wherein the powered first rollers are operable in each of a first and an opposite direction, such that after the container positioned on the conveyor is filled in the loading station, a direction of rotation of each of the powered first rollers is reversed to move the container out of the loading station and onto the power second rollers.

* * * * *

UNITED STATES PATENT AND TRADEMARK OFFICE
CERTIFICATE OF CORRECTION

PATENT NO. : 8,774,961 B2  
APPLICATION NO. : 12/766620  
DATED : July 8, 2014  
INVENTOR(S) : Anthony F. Morgott et al.

It is certified that error appears in the above-identified patent and that said Letters Patent is hereby corrected as shown below:

In the Specification

Column 6, Line 49: - delete "feed/discharge" and insert -- infeed/discharge --

Column 12, Line 9-10: - delete "load location" and insert -- loading station --

Signed and Sealed this
Twenty-eighth Day of October, 2014

Michelle K. Lee
*Deputy Director of the United States Patent and Trademark Office*